United States Patent [19]
Taylor et al.

[11] 3,917,343
[45] Nov. 4, 1975

[54] DOOR APPARATUS AND ACTUATOR FOR A CROP GATHERING MACHINE

[75] Inventors: Howard W. Taylor; Richard C. Pedersen, both of Grinnell, Iowa

[73] Assignee: Farmhand, Inc., Grinnell, Iowa

[22] Filed: Mar. 18, 1974

[21] Appl. No.: 451,943

[52] U.S. Cl. .............. 298/23 DF; 214/352; 296/56
[51] Int. Cl.² ........................................ B65G 67/30
[58] Field of Search ...... 298/23 DF, 23 D; 214/352; 296/56

[56] References Cited
UNITED STATES PATENTS
1,497,489  6/1924  Cochran ...................... 298/23 D X
FOREIGN PATENTS OR APPLICATIONS
374,034  4/1923  Germany ......................... 298/23 D Primary Examiner—Frank E. Werner
Assistant Examiner—George F. Abraham
Attorney, Agent, or Firm—Henderson & Strom

[57] ABSTRACT

A crop gathering machine for producing stacks of gathered crops including a chamber in a housing for receiving gathered crops. An outlet opening in the chamber has a door mounted thereon by a pivoted bar and a pivoted lever. A pulley arrangement is disposed on two sections of a pivoted frame and has a cable wrapped therearound. The cable is connected at one end to the lever. A hydraulic cylinder is mounted to one of the sections of the frame to thereby pivot the sections of the frame with respect to each other. Pivoting of the frame sections causes the cable to move the lever through a shortening or lengthening of the cable portion connected to the lever. Accordingly, movement of the lever controls the opening or closing of the door.

19 Claims, 5 Drawing Figures 3,917,343

DOOR APPARATUS AND ACTUATOR FOR A CROP GATHERING MACHINE

BACKGROUND OF THE INVENTION

The present invention relates generally to machines for gathering crops, and more particularly a door apparatus and actuator therefore, for a crop gathering machine.

In recent years crop gathering and stacking machines have become increasingly popular. Because of the large size of the stacks made by these machines, there has been a problem of unloading the stacks. It has been found that tipping the portion of the machine holding the stack, while moving the machine forward, aids in removing the stack from the back side of a crop gathering and stacking machine. Examples of such a tipping apparatus for a crop gathering machine may be seen in copending Ser. No. 412,735, and U.S. Pat. Nos. 3,366,357, 3,556,327 and 3,691,741.

Another problem with unloading the stacks of crops from a crop gathering machine has been the one of opening the rear outlet opening of such a machine. It will be readily understood by those skilled in this art that the rear outlet opening of such a machine must be closed in order to properly form the stack, yet it is necessary to have such outlet opening open at the time that the crop gathering machine is tipped, so that the stack may be removed. U.S. Pat. No. 3,556,327 shows a crop gathering machine having a sliding gate type door which moves upwardly along the stack during the opening thereof. U.S. Pat. Nos. 1,912,232 and 3,691,741 show swinging gate types of doors for the outlet opening of a crop gathering machine wherein the axes of the doors lie along one side of the crop gathering machine outlet opening.

While the prior art shows crop gathering machines which tip, and door devices and actuators of various kinds, no satisfactory structure has been heretofore found to combine these functions into a practical device.

SUMMARY OF THE INVENTION

The present invention relates to a crop gathering machine having frame members which tilt or tip to allow a stack of gathered crop to exit out of a rear outlet opening. A door is disposed on the machine outlet opening and is of a unique structure which moves directly away from the crop within the machine such that there is no friction between the door and the stack of crops within the machine during the opening or closing of the door. The door is constructed to help maintain the machine in a balanced condition at all times, and additionally is actuated by the tipping movement of the machine. A cable is connected to at least one of the tipping portions of the machine and, upon such tipping, pulls the door open. A pulley arrangement is operatively connected to the cable and serves to amplify the pulling movement of the cable, thereby increasing the leverage available to open the door.

An object of the present invention is to provide an improved door for a crop gathering machine.

Another object of the invention is to provide a door for a crop gathering machine which does not rub against the crops stacked in the machine during the movement of the door.

A further object of the invention is to provide a door which is balanced with respect to the crop gathering compartment of the machine.

Still another object of the invention is to provide an arrangement whereby a single actuator will tip a crop gathering machine and simultaneously open the outlet door of the crop gathering machine without using a complicated structure.

A still further object of the present invention is to utilize the tipping of a crop gathering machine to open the door of such machine.

Still another object of the present invention is to provide an amplifying means for such a crop gathering machine to amplify the cable movement caused by the tipping of the machine and thereby achieve a mechanical advantage in the opening of the outlet door.

Other objects, advantages, and novel features of the present invention will become apparent from the following detailed description of the invention when considered in conjunction with the accompanying drawings.

BRIEF DESCRIPTION OF THE DRAWINGS

FIG. 5 shows the hydraulic cylinder in a second extended position such that the two frames of the machine are tipped with respect to each other, and the door is thereby opened.

DESCRIPTION OF THE PREFERRED EMBODIMENT

Figure 1:
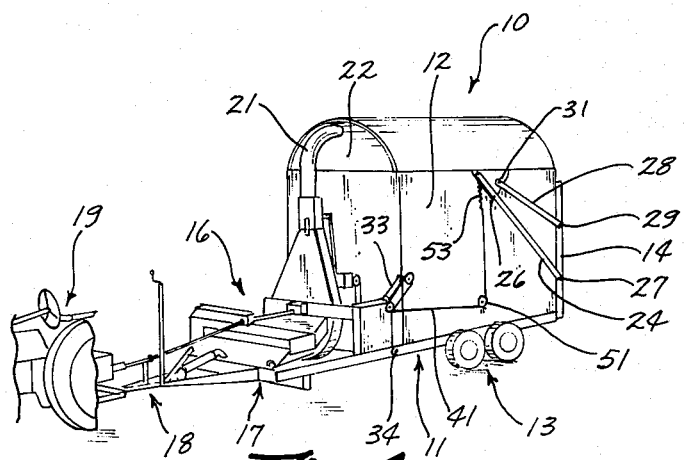
FIG. 1 is a perspective view of the crop gathering apparatus of this invention shown in assembled relation with a covered wagon.

Referring now to the drawings wherein like reference numerals designate identical or corresponding parts throughout the several views, FIG. 1 shows a crop gathering apparatus 10, which includes a frame assembly 11 for carrying a crop receiving wagon 12. The crop receiving wagon 12 is mounted upon wheel and axle unit 13 and has an outlet door 14 on the rear end thereof. A gathering apparatus 16 is mounted on second frame assembly 17, which in turn is pivotally mounted to the first frame assembly 11. A towing hitch 18 connects the crop gathering machine 10 to the tractor or prime mover 19.

Figure 2:
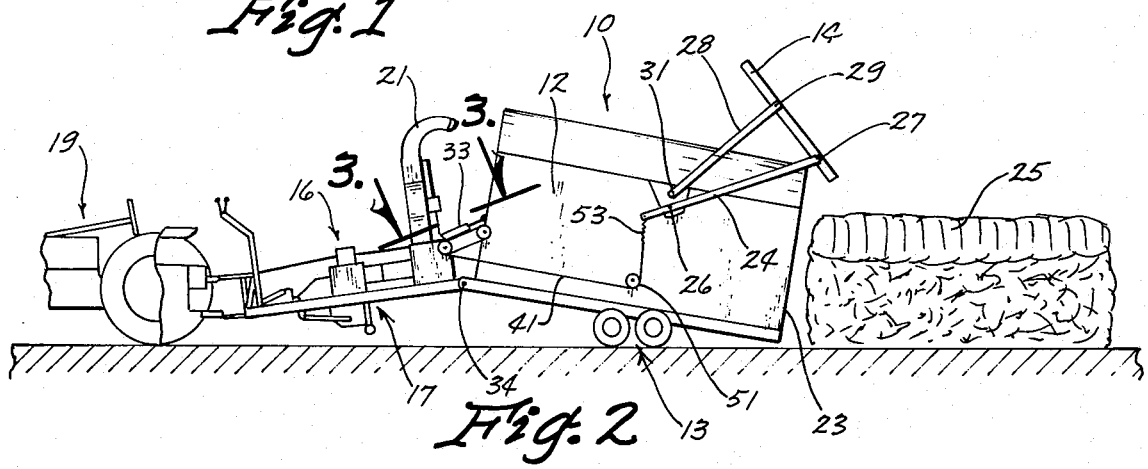
FIG. 2 is a side elevational view of the crop gathering machine of the present invention showing the apparatus in a tipped position, with the door raised and a stack of gathered crops slid out of the rear of the machine.

The crop gathering assembly 16 forms no part of this invention, but is fully disclosed in copending Ser. No. 412,735. The crop receiving assembly 16, generally picks up crops and deposits these crops through spout 21 into opening 22 in the front portion of crop receiving wagon housing 12. The crops are then formed into a stack within the crop receiving wagon housing 12 and eventually emerges as a stack 25 of crops as best seen in FIG. 2.

The door 14 is mounted to open or close the rear outlet opening 23 of crop receiving housing 12. A lever 24 is disposed upon each side of the crop receiving wagon housing 12. Lever 24 is pivotally mounted intermediate its ends at pivotal point 26. The lever 24 is also pivotally connected to the lower portion of door 14, at pivotal point 27. A bar 28 is also pivotally connected to the door at pivotal point 29, and is additionally pivoted to the crop receiving wagon housing 12, at pivotal point 31. Accordingly, the door will move from the open position as shown in FIG. 1, to the closed position as shown in FIG. 2. The lengths of levers 24 and bars 28 are adjusted such that the door 14 misses the corner 32 on its upward and downward arc of movement.

Figure 3:
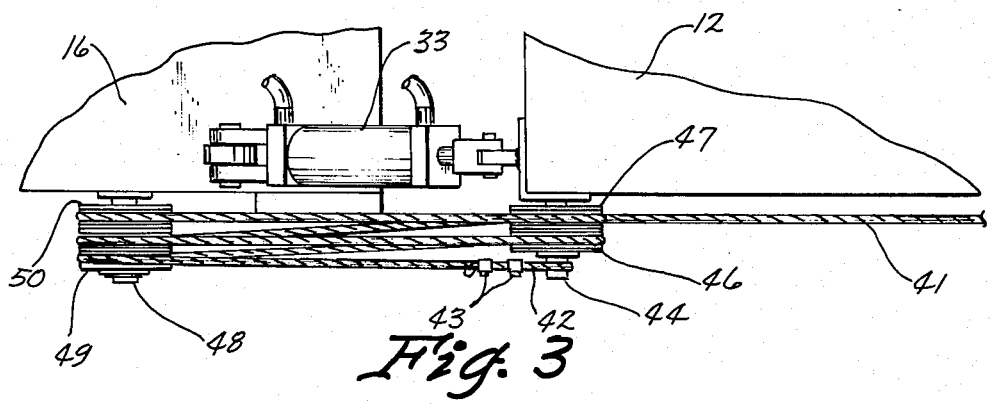
FIG. 3 is a view taken along line 3—3 of FIG. 2 and showing a partial view of the pulley amplifying device and the hydraulic cylinder.
Figure 4:
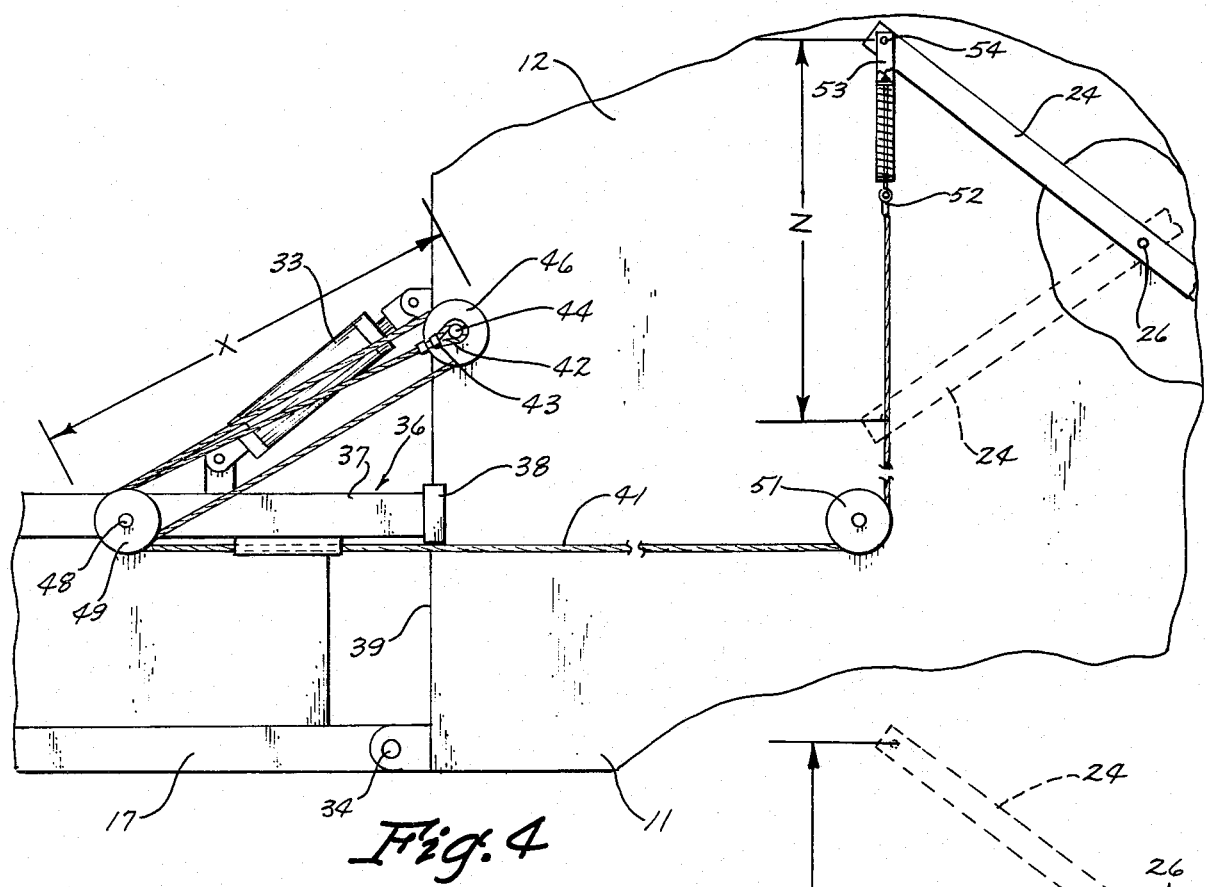
FIG. 4 is a partial side elevational view of the pulley amplifying means, hydraulic cylinder tipping apparatus and the lever actuating means for the door, in the closed position of the door.
Figure 5:
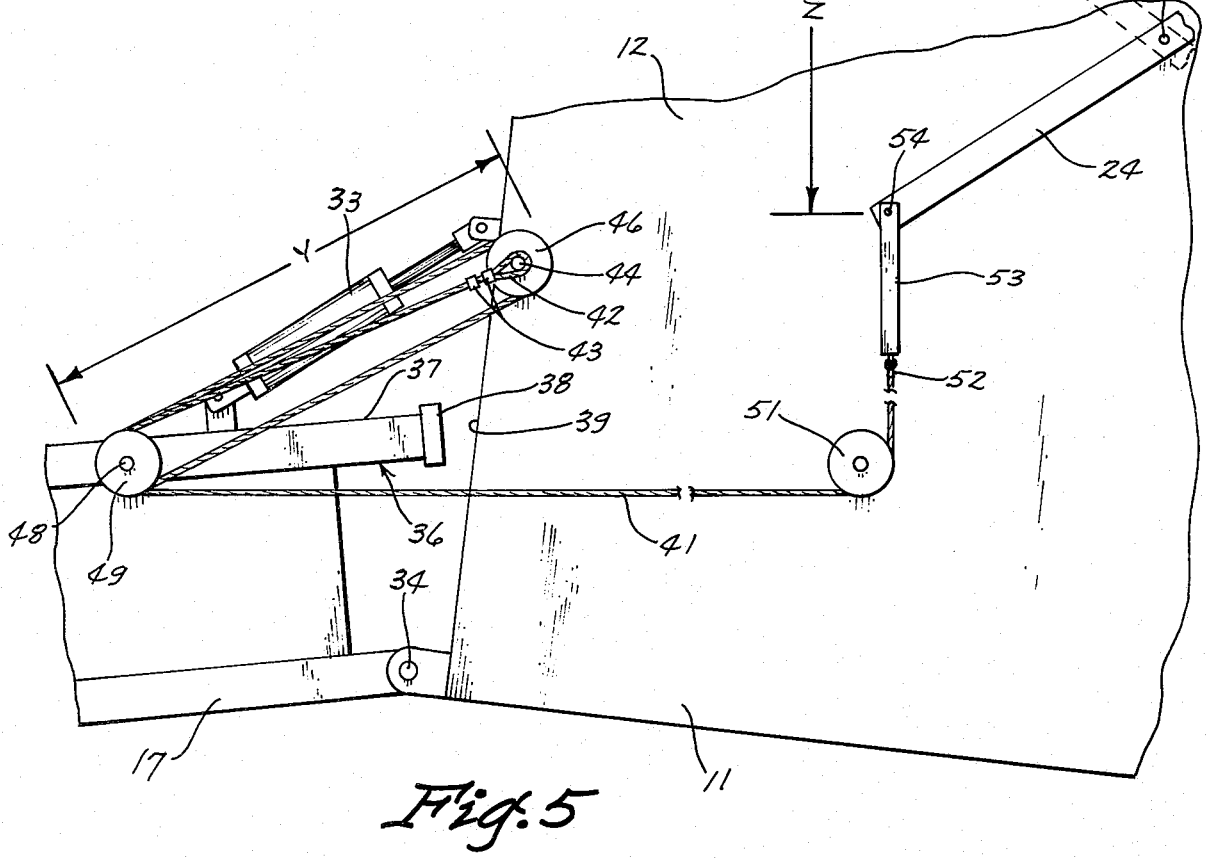
FIG. 5 is identical to the view in FIG. 4, except

The actuation of the door is accomplished by a hydraulic cylinder 33, as can best be seen in FIGS. 3–5. When the hydraulic cylinder 33 is extended as shown in FIGS. 2 and 5, the frame is pivoted at pivotal point 34. When the hydraulic cylinder 33 is retracted, as shown in FIGS. 1 and 4, the first frame assembly 11 and the second frame assembly 17 are aligned. This alignment of first and second frame assemblies 11 and 17 respectively are accomplished, not only by the action of hydraulic cylinder 33, but also by the leveling apparatus 36, including bar members 37 and angle bar shaped members 38 which abut the front corners 39 of the housing 12 on each side of the machine.

A cable 41 is connected at one end 42, by a clasp 43 to a shaft 44. Upon the shaft 44 is connected pulleys 46 and 47. A similar shaft 48 is connected to the second frame assembly 17 and pulleys 49 and 50 are mounted thereto. It is to be understood that the pulleys 46, 47, 49 and 50 may be rotatably mounted to the shafts 44 and 48 and the shafts 44 and 48 rigidly connected to frame assemblies 11 and 17 respectively. Alternatively, the pulleys 46, 47, 49 and 50 may be solidly affixed to the shafts 44 and 48, and the shafts then rotatably mounted to the respective first and second frame assemblies 11 and 17.

The cable 41 is wrapped around the pulleys 46, 47, 49 and 50, as best shown in FIG. 3. Cable 41 is also operatively disposed around another pulley 51 which is rotatably mounted to the housing 12. The other end 52 of cable 41 is connected to spring cushion mechanism 53, which, in turn, is pivotally mounted at pivotal point 54 to one end of the lever 24.

In operation, the tractor 19 pulls the crop gathering machine 10 along in a forward direction (left in FIGS. 1 and 2). The crop gathering assembly 16 gathers the crops and places them in the crop receiving wagon housing 12 through an opening 22 in the front thereof. The door 14 of the wagon housing 12 remains closed until the complete stack 25 is formed. Once the stack 25 is complete, the hydraulic cylinder 33 is extended, as in the positions shown in FIGS. 2 and 5. The operation of extending the hydraulic cylinder 33 tilts the first and second frame assemblies 11 and 17 respectively, with respect to each other. Additionally, this tilting movement causes the pulleys 46 and 47 to be displaced farther away from pulleys 49 and 50, whereby the other end 52 of cable 41 pulls the lever 24 from the position shown in solid lines in FIG. 4 to the position of lever 24 shown in solid lines in FIG. 5. It is to be noted that the distance (Z) that the end of lever 24 is displaced is approximately six times the difference between the distance Y and the distance X. To state this in terms of an equation, $Z = 6(Y-X)$, approximately. This amplifying effect caused by the pulleys can best be understood by noting that there are five links of cable between the pulleys on the first frame assembly 11, and the pulleys 49 and 50 on the second frame assembly 17, such that movement from the position shown in FIG. 4 to the position shown in FIG. 5 causes the other end 52 of cable 41 to move $5(Y-X)$, disregarding for the moment the amount of movement caused by the cable section disposed between pulley 50 and pulley 51. Now considering the movement caused by the section of cable between pulleys 50 and 51, it is noted that the section of cable between pulleys 50 and 51 is not exactly aligned parallel with the line between axis 44 and 48. This additional section of cable does not add a complete length of Y minus X, but does approximately add such an additional amplification of one $(Y-X)$. It is to be understood that the present invention could operate by fastening the other end 42 of cable 41 to the second frame assembly 17, for example at the approximate position of member 48, and the lever 24 would still be pulled downwardly. It will be understood that in such an arrangement the lever 24 would need to be longer on the left side from the pivotal point 31 in such an arrangement. However, the pulleys 46, 47, 49 and 50 eliminate this need to lengthen lever 24 and approximately amplify the movement of the other end 52 of the cable 41 to obtain the desired mechanical advantage.

Once the frame is tipped, as shown in FIG. 2, and the door 14 is open, forward movement of the tractor 19 and crop gathering machine 10 allow the stack 25 to gently slide out of rear opening 23 and onto the ground. The hydraulic cylinder 33 is then retracted and the crop gathering and stack forming operation can then be begun again.

Obviously many modifications and variations of the present invention are possible in light of the above teachings. It is therefore to be understood that, within the scope of the appended claims, the invention may be practiced otherwise than as specifically described.

I claim:

1. A door actuating apparatus for a crop gathering machine comprising:

a first frame;

a housing attached to said first frame;

a chamber within said housing for receiving gathered crops;

an open space disposed at one end of said chamber for allowing removal of gathered crops from the chamber;

a door for opening or closing said open space of the chamber;

door control means for selectively moving said door to an open or to a closed position, said door control means comprising:

a second frame pivotally attached to the first frame;

a cable operatively connected at one end to the second frame and operably connected at the other end to the door; and means connected to said first and second frames for pivoting one of said frist and second with respect to the other frame from an unpivoted position to a pivoted position, whereby in the pivoted position the other end of the cable is pulled and the door is in an open position, and in an unpivoted position the other end of the cable is loosened and the door is in a closed position.

2. A door actuating apparatus as defined in claim 1 wherein said door control means includes pulley amplifying means coacting with the cable for increasing the distance that said other end of the cable moves, upon operation of the pivoting means.

3. A door actuating apparatus as defined in claim 2 wherein said pulley amplifying means includes at least one pulley rotatably and operatively mounted on said housing and at least one pulley rotatably mounted to the second frame, the cable being wrapped in a loop around the pulleys.

4. A door actuating apparatus as defined in claim 3 wherein another pulley is connected to each of said housing and said frame along the same axis as said at least one pulley, respectively, of said housing and second frame, and said cable forms a second loop around said another pulleys.

5. A door actuating apparatus as defined in claim 4 wherein an additional pulley operatively engaging the cable is rotatably connected along the same axis as said at least one pulley on said second frame.

6. A door actuating apparatus as defined in claim 3 wherein another pulley is rotatably mounted on said housing whereby the axis thereof is fixed with respect to said first frame and said cable operatively engages said another pulley.

7. A door actuating apparatus as defined in claim 6 wherein the connection between the door and cable is a lever pivoted intermediate its ends on said housing and being operably connected at one end to the door and at the other end to the other end of said cable, whereby the pulling of the other end of the cable pivots the lever to thereby move the door to an open position.

8. A door actuating apparatus as defined in claim 7 wherein a leveling means is attached to one of said first or second frames to maintain said frames level with respect to each other when said pivoting means is not in operation.

9. A door actuating apparatus as defined in claim 8 wherein said leveling means comprises a member spaced from the pivotal point of said frames having one end adapted to abut a part integrally connected to the other of said first or second frames.

10. A door actuating apparatus as defined in claim 7 wherein said connection of one end of the lever to the other end of the cable includes a resilient cushion means.

11. A door actuating apparatus as defined in claim 7 wherein a bar is pivotally connected at one end to said door and at the other end to said housing.

12. A door actuating apparatus as defined in claim 11 wherein said pivotal connection of the bar to the door is on the top portion of the door and the pivotal connection of the lever to the door is on the bottom portion of the door.

13. A door actuating apparatus as defined in claim 12 wherein said bar and said lever are non-parallel.

14. A door actuating apparatus as defined in claim 1 wherein said means for pivoting said first frame with respect to said second frame comprises a hydraulic cylinder selectively operable to and from an extended and a retracted position.

15. A door apparatus for a crop gathering machine comprising:
a housing;
a chamber in said housing for receiving gathered crops;
an open space disposed at one end of said chamber for allowing removal of gathered crops from the chamber;
a door means including a door operably connected to said housing for opening or closing said open space, said door means having a first position opening said open space and a second position closing said open space, whereby the initial movement of said door from a closed to an open position moves the entire door away from the opening to thereby avoid contact of the door and gathered crops in the chamber while the door is opening or closing;
said door means comprising a lever pivotally mounted intermediate its ends to said housing, said lever being pivotally mounted at one end to the door, a bar pivotally connected to said door and to said housing, said pivotal connection of the lever to the door being on the lower portion of the door and the pivotal connection of the bar to the door is on the upper portion of the door, and wherein said pivotal connections of the lever and bar to the housing are above the pivotal connections of the lever and bar to the door when the door is in a closed position.

16. A door apparatus for a crop gathering machine as defined in claim 15 wherein said lever and bar are non-parallel.

17. A door apparatus for a crop gathering machine as defined in claim 15 having means for moving the other end of said lever to thereby selectively move the door means.

18. A door apparatus for a crop gathering machine as defined in claim 15 including a second lever pivotally mounted intermediate its ends to one side of said housing, said second lever being pivotally mounted to the door.

19. A door apparatus for a crop gathering machine as defined in claim 18 wherein a second bar is pivotally connected to said door and to one side of said housing.

* * * * *